Figure 1:
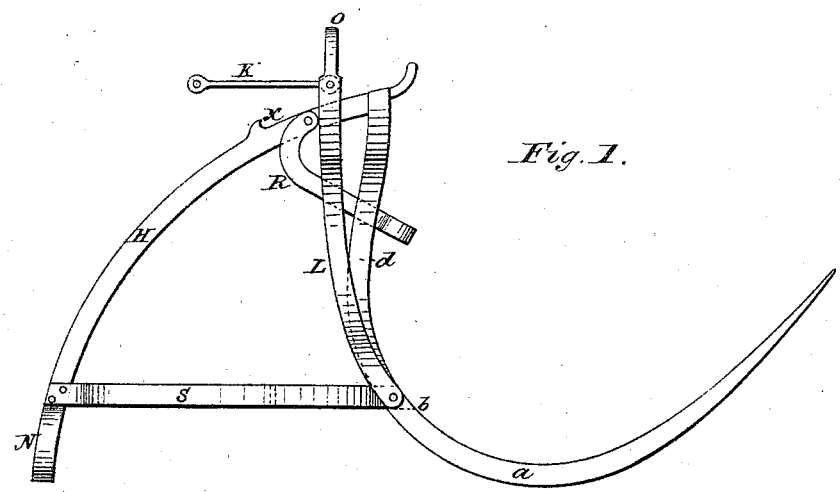
Figure 2:
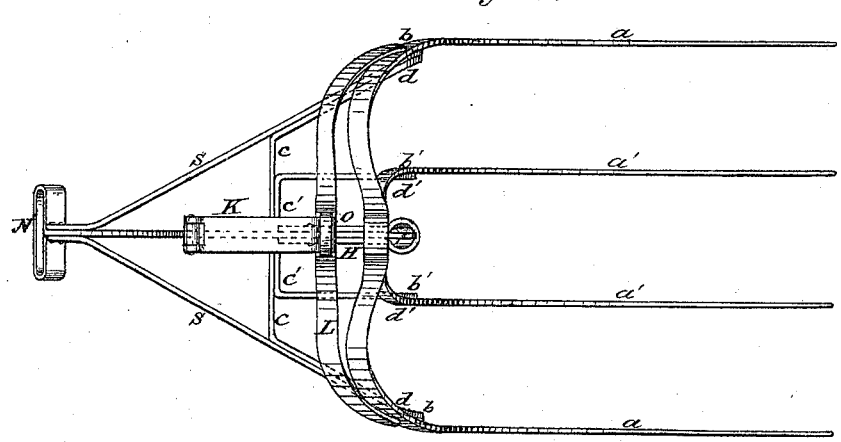

N. PALMER.
Horse Hay-Forks.

No. 134,482.  Patented Dec. 31, 1872.

Witnesses:
T. C. Brecht
O. E. Duffy

Inventor:
Nelson Palmer

UNITED STATES PATENT OFFICE.

NELSON PALMER, OF ATHENS, ASSIGNOR TO DAVIS WHEEL AND PALMER FORK COMPANY, OF NEW YORK, N. Y.

IMPROVEMENT IN HORSE HAY-FORKS.

Specification forming part of Letters Patent No. 134,482, dated December 31, 1872.

*To all whom it may concern:*

Be it known that I, NELSON PALMER, of Athens, Greene county, and State of New York, have invented certain Improvements in Horse Hay-Forks, of which the following is a specification:

In order to understand the nature and object of this improvement, I will proceed to describe it, reference being had to the accompanying drawing forming part of this specification.

Figure I is a side elevation. Fig. II is a plan view, both figures showing the fork in the same position.

Like letters refer to corresponding parts in both figures.

This invention consists of a system of bracing to support the tines of the fork and hold them in a proper position for use.

The fork to which this system of bracing is here applied consists of four tines, $a\ a\ a'\ a'$, curved and equidistant from each other, from their points back to the base of the tines at $b\ b\ b'\ b'$. From these points they become braces $d\ d\ d'\ d'$, to aid in supporting the tines $a\ a'$. These braces $d\ d'$, curving toward the points of the tines $a\ a'$, converge to a point at the top of the handle H, to which they are bolted. The handle H, curving backward and downward in the arc of a circle, terminates with a loop, N, for convenience in handling the fork. To the handle H near its lower extremity are bolted two braces, S S, extending from the handle H to the base of the tines $a\ a$. These braces S S are or may be bent short at their place of contact with the bases $b\ b$ of the tines $a\ a$, and extend backward, being double about one-third of their length. There they form a bar or cross-brace, $c\ c$, connecting braces S S back of the tines $a\ a\ a'\ a'$ at their bases $b\ b\ b'\ b'$, about one-quarter of the distance from these tines to the handle H. To the center of this cross-bar $c\ c$ is bolted or riveted on the front side a shorter bar, $c'\ c'$, both ends of which are bent to stand at right angles with the cross-bar $c\ c$, and extending forward become supports of and are bolted to the tines $a'\ a'$ at their bases $b'\ b'$. By this bracing the tines are all supported against any strain upon them, either endwise or lateral. The cross-bar $c\ c$ is stronger by making it short, throwing it back of the tines and supporting the ends against the braces S S, and the last-named braces S S are supported by resting against the ends of the cross-bar $c\ c$ so near their centers; and as a crowning excellence, the capacity of the fork is increased by placing the cross-bar $c\ c$ so far back of the tines $a\ a'$, thus allowing the tines to be pressed further into the hay or other commodity to be handled outside. At the base of the tines $a\ a$ is hinged a bail, L, by bolts, which also hold the braces S S and the cross-bar $c\ c$ firmly to the inside of the tines $a\ a$ at that point. The bail L, which curves in conformity with the braces $d\ d'$, extends above the top of the handle H and culminates in the loop O, to which the power is applied in operating the fork. To hold the bail L in position when in use, a catch, K, is hinged on a bolt passing through the parallel sides of the bail L below the loop O, and, extending backward and downward along the handle H, falls into a notch, $x$, in the upper edge of the handle H, and locks the bail and fork for hoisting. To unlock the fork I use a cam-lever to which a trip-rope is attached.

What I claim as my invention, and desire to secure by Letters Patent, is—

1. The braces S S, the cross-bar $c\ c$, and braces $c'\ c'$, in combination with the handle H and tines $a\ a'$, substantially as specified.

2. The combination of tines $a\ a'$, the curved braces $d\ d'$, the handle H, braces S S, cross-bar $c\ c$, braces $c'\ c'$, bail L, catch K, and lever R, constructed and operating substantially as set forth.

NELSON PALMER.

Witnesses:
   GARDNER S. CUTTING,
   WM. S. RIDABOCK, Jr.